INVENTOR.
JOHN J. QUACKENBUSH
HERBERT O. CORBETT

JOHN J. QUACKENBUSH
HERBERT O. CORBETT
INVENTOR

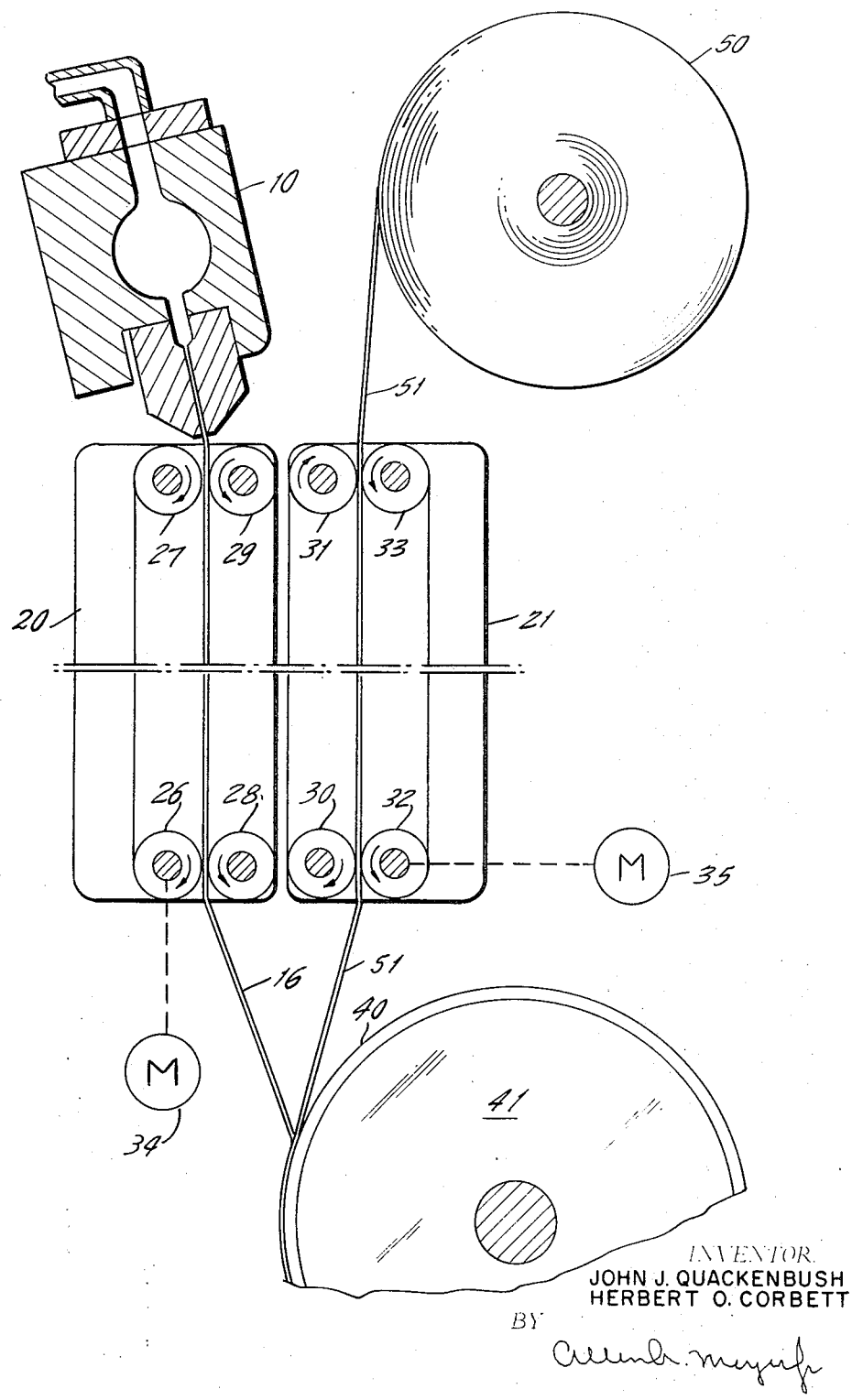

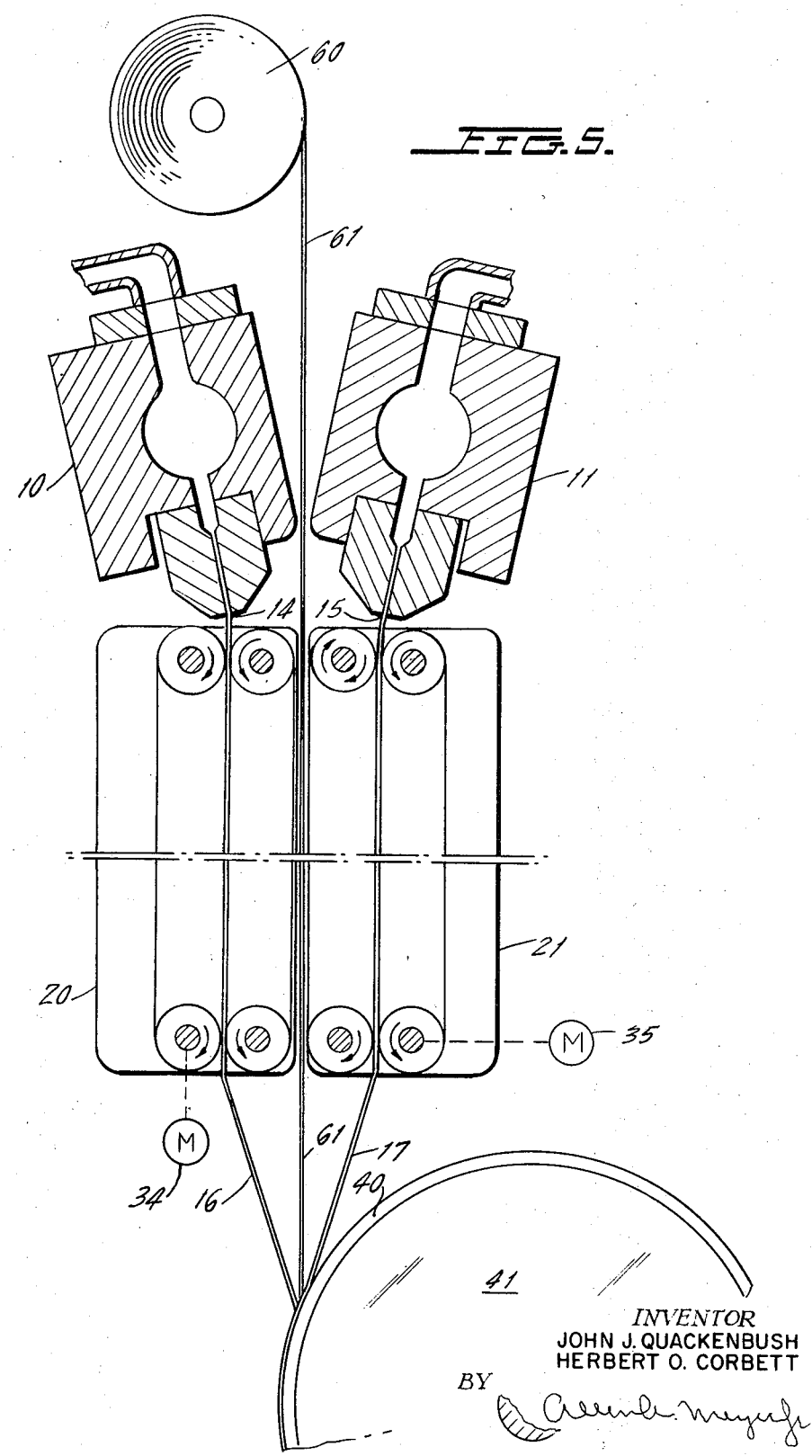

United States Patent Office 3,516,886
Patented June 23, 1970

3,516,886
MULTI-WEB LAMINATED EXTRUSION PROCESS
John J. Quackenbush and Herbert O. Corbett, Bridgeport, Conn., assignors to National Distillers and Chemical Corporation, New York, N.Y., a corporation of Virginia
Filed Dec. 14, 1966, Ser. No. 602,114
Int. Cl. B29c 17/02
U.S. Cl. 156—244         6 Claims

ABSTRACT OF THE DISCLOSURE

Two webs of thermoplastic material are individually extruded and are guided by respective web guides toward a common chill roll. The two webs are laminated at the chill roll to form a single web. Webs of other material, such as paper or screening, are passed between the two webs before they are laminated and are encapsulated between the two plastic films after lamination. Alternatively, a single plastic web and a web of some other material, such as fabric or paper, is passed through the spaced web guides for laminating a single plastic layer atop the surface of the non plastic web.

This invention relates to the lamination of an extruded, flat plastic web to another flat plastic web, or to a flat web of non-plastic material, and more specifically relates to a process for the extrusion of laminated articles including at least one layer of plastic wherein the two webs to be laminated together are conducted through parallel disposed web guide structures and are laminated at the surface of a chill roll which tangentially receives the two webs.

It is, therefore, a primary object of this invention to provide a novel laminating process wherein two parallel disposed webs of flat material laminate together at the surface of the chill roller of a suitable haul-off unit positioned at the outlet of the web guide units.

Another object of this invention is to provide a novel plastic extrusion apparatus which permits the use of small width dies for the extrusion of large width film.

Yet another object of this invention is to provide a novel process for the extrusion of plastic film incorporating two small length discharge dies having respective web guides at their outlets for stretching the film to a width greater than the discharge orifice of the die, and thereafter laminating the two stretch films together at a suitable chill roll haul-off unit.

A further object of this invention is to provide a novel method for coating a carrier web with plastic material.

Yet another object of this invention is to provide a novel method for encapsulating a web of material between two plastic surface webs.

These and other objects of this invention will become apparent from the following description when taken in connection with the drawings, in which:

FIG. 1 schematically illustrates apparatus in accordance with the present invention for laminating two flat webs of plastic material.

FIG. 3 is similar to FIG. 1 and illustrates an embodiment of the invention wherein one of the extruders of FIG. 1 is replaced by a pre-formed web of paper, or the like, which is to be coated on one surface with a plastic material.

FIG. 5 illustrates a further modification of FIG. 1 wherein a pre-formed web of material, such as paper or the like, is disposed between the two web guides so that the material is encapuslated between the two plastic webs issuing from the two plastic dies.

Figure 1:
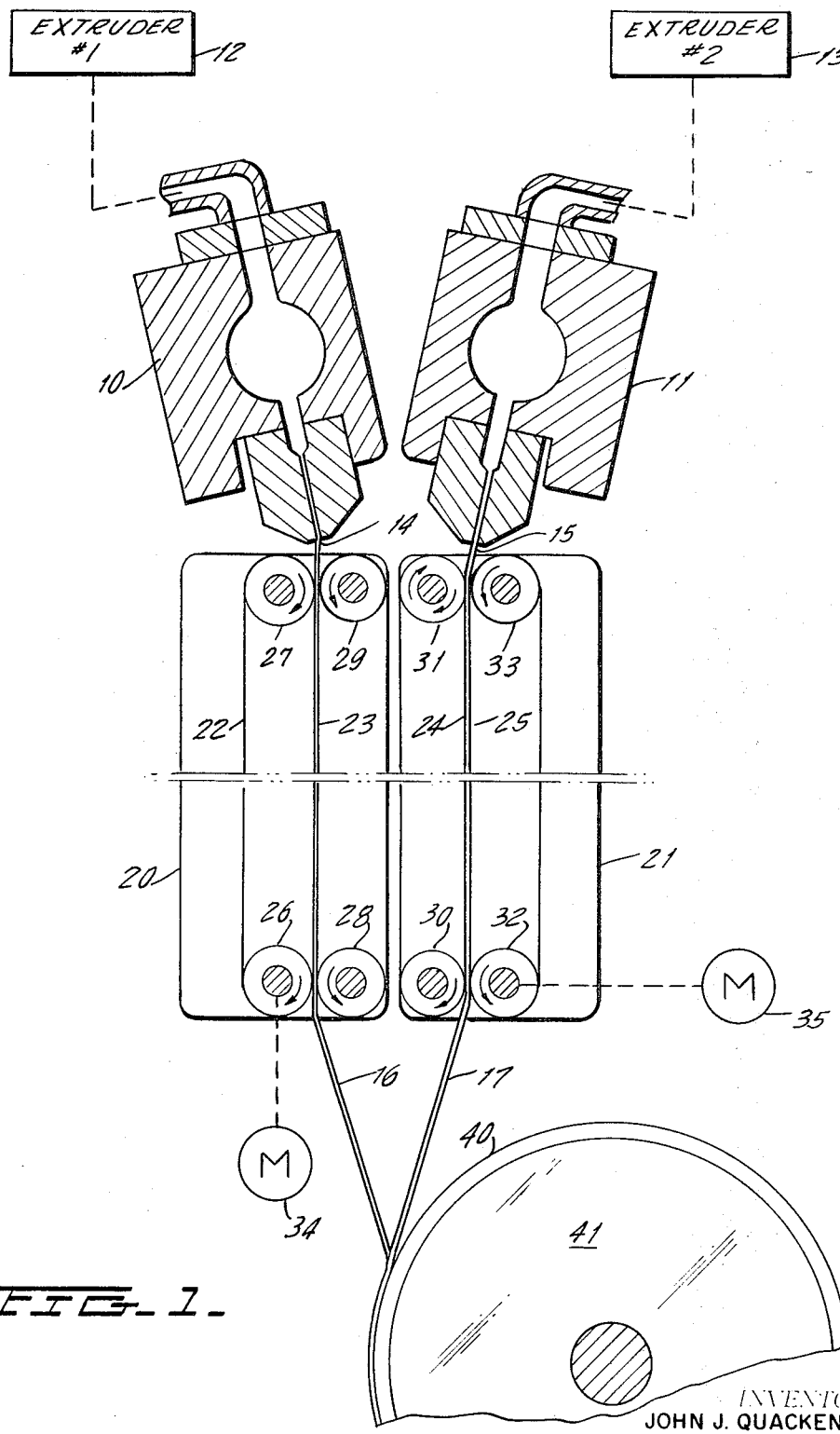
Figure 2:
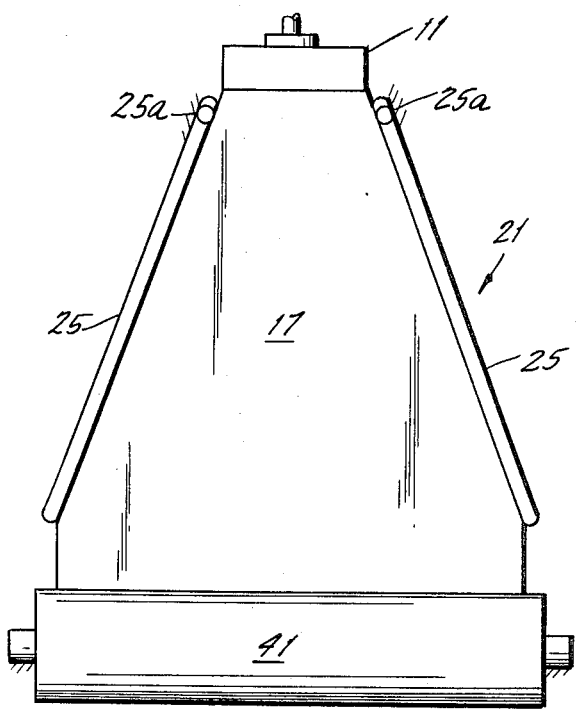
FIG. 2 is a side plan view illustrating the stretch ratio of the power driven web guides of FIG. 1 with the chill roll at the outlet end of the web guide, and a relatively small length discharge die at the input end thereof.

Referring first to FIGS. 1 and 2, there is illustrated two standard extrusion dies 10 and 11 which are connected, as shown in FIG. 1, to respective extruders 12 and 13. Each of dies 10 and 11 have discharge orifices 14 and 15 which issue respective webs of plastic film shown as webs 16 and 17, respectively. The dies 10 and 11 may be of any standard well known variety and can have any length, such as from 6 to 30 inches, where, however, one of the particular advantages of the present invention is that the dies 10 and 11 can have a relatively short length, such as 10 inches where, however, the exit of the film web prior to lamination can be 50 inches. This extension in film width is obtained by the use of suitable web guides 20 and 21 for webs 16 and 17, respectively, where the web guides include positively disposed belts, or any other suitable gripping means 22 and 23, for web guides 20 and belts 24 and 25 for web guide 21. Each of the belts 22 through 25 are formed in two pairs disposed at the outer ends of rollers 26–27, 28–29, 30–31 and 32–33 with these members being rotated by respective motor drives 34 and 35. The belts grip the plastic web at its opposite edges, as schematically illustrated in FIGS. 1 and 2 for the belt pairs 25 which grip the film against belt 24. Power driven web guides of this type are well known and are shown in detail in copending application Ser. No. 352,841, filed Mar. 18, 1864, in the name of Herbert O. Corbett, John J. Quackenbush and Charles H. Allen and assigned to the assignee of the present invention.

The present invention is not concerned with the details of the construction of dies 10 and 11 or of web guides 20 and 21, but is concerned with novel methods of making laminates employing novel combinations of these well known subassemblies where, for example, as illustrated in FIG. 1, the sets of web guides 20 and 21 are disposed in parallel spaced relation to one another and respectively receive and stretch webs 16 and 17 issuing from discharge orifices 14 and 15. Note the positively driven web guide support for the film forms a positive support permitting extension of the film width as it moves downwardly in the web guides at relatively high haul-off speeds and relatively large thickness without melt slump.

Figure 6:
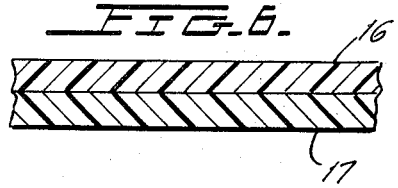
FIG. 6 is a cross-sectional view of the laminated film produced in the apparatus of FIG. 1.
Figure 7:
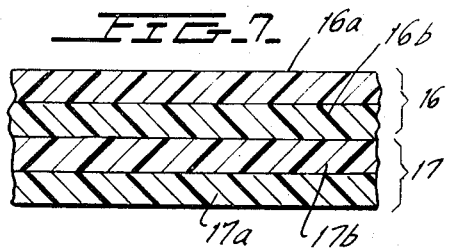
FIG. 7 is a cross-sectional view of the plastic film which can be obtained from the apparatus of FIG. 1 wherein each of the dies issues a respective laminated film.

The webs 16 and 17, when issuing from the bottom of web guides 20 and 21, are still in a molten or semi-molten state and are forced to converge on the surface 40 of a water cooled roll 41 where the webs 16 and 17 finally laminate with one another. After passing through the suitable chill roll system, the laminated web can be wound in a suitable storage roll (not shown). The laminated film will then have the form illustrated in FIG. 6 where the webs 16 and 17 are laminated into a single web. If desired, the dies 10 and 11 could have been constructed as well known laminating dies which themselves issue laminated films, whereupon the product formed on roll 41 would be the configuration shown in FIG. 7 comprised of film 16 which is, in turn, laminated of layers 16a and 16b, while the web 17 would be formed of the laminate of sublaminations 17a and 17b. Note that the film width can be easily controlled by rotating the web guide members of FIG. 2 around their schematically pivotal supports 25a which is the standard support structure for such power driven web guides.

Figure 4:
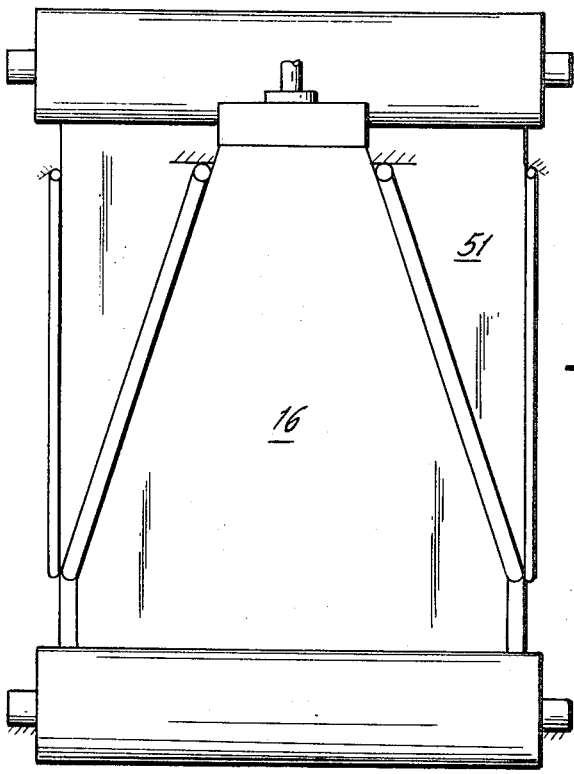
FIG. 4 is a side plan view of FIG. 3 illustrating the arrangement of the two web guides.

FIGS. 3 and 4 illustrate a modification of the arrangement of FIGS. 1 and 2 wherein the die 11 of FIG. 1 has been replaced by a pre-formed roll of paper 50, or the like, which has a web 51 issuing therefrom. The web guides 20 and 21 are identical to those of FIG. 1 and operate in an identical manner where, however, the web guide belts gripping the paper web 51 do not diverge but are parallel, thereby to continually guide the moving web 51 downwardly in closed spaced relation to the plastic web 16. The plastic web 16 is then brought into contact with the surface of paper web 51 at the surface 40 of chill roll 41, whereupon the plastic 16 freezes on the paper 51 to effect a plastic coating over the paper. Clearly, web 51 could be of any desired material such as some other pre-formed plastic or a suitable reinforcing cloth mesh, or the like.

Figure 8:
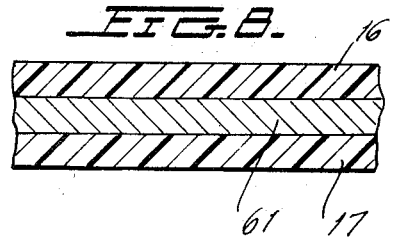
FIG. 8 is a cross-sectional view of the type product which can be obtained from the apparatus of FIG. 5 in which a web of printed material is encapsulated between the two plastic webs issuing from the two respective extrusion dies.

FIG. 5 illustrates a still further modification of FIG. 1 where a paper roll 60, having a web 61 issuing therefrom, which has a width somewhat smaller than the width of webs 16 and 17 issuing from the bottom of web guides 20 and 21, is disposed between the spaced web guides 20 and 21. Thus, the web 61 of paper, which could be pre-printed, will be encapsulated between webs 16 and 17 with all three webs joining at generally the same point on the surface 40 of chill roll 41 where the plastic webs 16 and 17 are frozen. The product then formed will appear as illustrated in FIG. 8 where the web 61 is captured between the opposing surfaces 16 and 17 which are of plastic material.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A process for forming a laminate of a first and second web of material comprising continuously extruding said first web from a first die having a first discharge length directly into diverging web guides, extending the width of said first web by said web guides which grip the lateral sides of said first web and continuously move said first web away from said first die, continuously moving said second web at a speed equal to the speed at which said first web issues in molten or semimolten form from said web guides, moving said first and second webs into a cooling region and bringing said first and second webs to surface-to-surface contact at said cooling region to laminate said first and second webs.

2. The process of claim 1 wherein said cooling region comprises a rotatable chill roll; said first and second webs moving generally tangentially toward the surface of said chill roll and engaging one another at the surface of said chill roll.

3. The process of claim 1 wherein said second web is continuously extruded from a second die identical to said first die and is extended in width to the ultimate width of said first web by second diverging web guides disposed in parallel spaced relation to the first mentioned web guides, gripping the lateral sides of said second web and continuously moving said second web away from said second die.

4. The process of claim 3 wherein said first and second webs are moved in parallel spaced planes within their said respective web guides.

5. The process of claim 4 wherein said second web is of non-extensible material and is gripped at its lateral opposing sides by second parallel web guides which continuously move said second web generally parallel with said first web in its said web guides.

6. The process of claim 3 which includes a third web disposed between said first and second webs moving parallel to said first and second webs at a speed matching the speed of said first and second webs as they issue in molten or semimolten form from their said web guides, and encapsulating said third web between said first and second webs at said cooling region.

References Cited

UNITED STATES PATENTS

| | | | |
|---|---|---|---|
| 2,412,187 | 12/1946 | Wiley et al. | 264—210 |
| 2,594,229 | 4/1952 | Snyder et al. | 156—229 |
| 3,003,903 | 10/1961 | Vaughan | 156—229 |
| 3,186,893 | 6/1965 | Mercer | 156—229 |
| 3,234,066 | 2/1966 | Mulholland | 156—244 |
| 3,420,679 | 1/1969 | Gifford et al. | 156—244 |

CARL D. QUARFORTH, Primary Examiner

H. E. BEHREND, Assistant Examiner

U.S. Cl. X.R.

156—229; 264—210